United States Patent [19]

Holland

[11] 4,280,804
[45] Jul. 28, 1981

[54] VACUUM CURING TOOL FOR COMPOSITE MATERIALS

[75] Inventor: Charles L. Holland, Escondido, Calif.

[73] Assignee: General Dynamics, San Diego, Calif.

[21] Appl. No.: 81,020

[22] Filed: Oct. 1, 1979

[51] Int. Cl.³ .............................................. B29C 17/04
[52] U.S. Cl. ..................................... 425/388; 264/316; 425/389; 425/DIG. 19; 425/DIG. 44
[58] Field of Search ............... 425/388, 389, DIG. 19, 425/DIG. 44; 264/510, 552, 554, 571, 314, 316; 156/285, 286, 382; 428/33; 150/52 R; 249/65

[56] References Cited

U.S. PATENT DOCUMENTS

| | | | |
|---|---|---|---|
| 2,441,097 | 5/1948 | Hicks | 264/316 X |
| 3,146,148 | 8/1964 | Mitchella et al. | 156/382 |
| 3,334,383 | 8/1967 | Irvine | 425/389 |
| 3,666,600 | 5/1972 | Yoshino | 156/382 |
| 4,117,875 | 10/1978 | Hickey | 150/52 R |
| 4,149,578 | 4/1979 | Hickey | 150/52 R X |

Primary Examiner—Jan H. Silbaugh
Attorney, Agent, or Firm—Frank D. Gilliam

[57] ABSTRACT

A vacuum tool for a vacuum bagging curing operation comprising a base on which is placed a one piece vacuum bag comprising a top sheet with a peripheral sealing means attached thereto which cooperate to seal the bag in a zipper-like fashion, thus enclosing workpiece therein for the vacuum curing operation. A vacuum manifold is attached to the base to connect the tool to a vacuum pump to create a vacuum between the base and bag.

3 Claims, 4 Drawing Figures

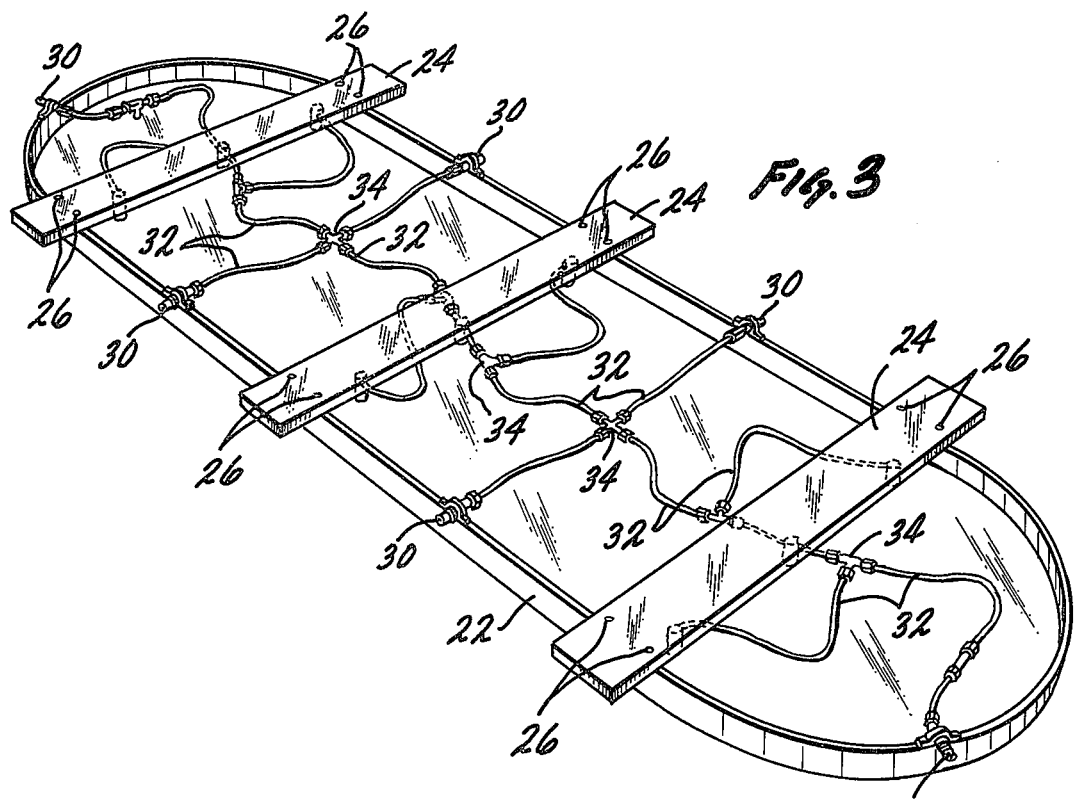
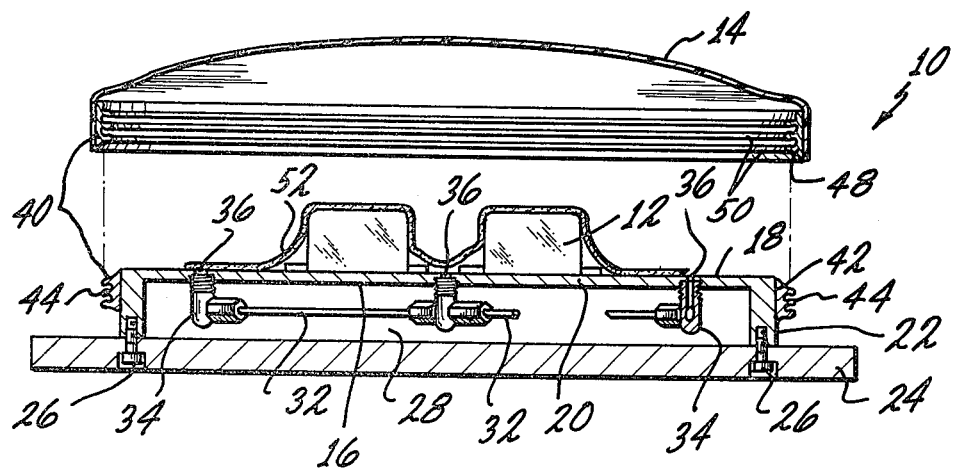

VACUUM CURING TOOL FOR COMPOSITE MATERIALS

BACKGROUND OF THE INVENTION

This invention relates to vacuum curing of composite workpieces and, more particularly, to a new and improved vacuum curing tool.

The fabrication of molded products utilizing a vacuum bag is well known in the art. However, in the prior art, the normal procedure in this technique comprises attaching a vacuum curing bag to the tool on which the part is to be formed and securing the bag with vacuum putty, tape, mechanical clamps, or a combination of these. One or more holes are then formed in the vacuum curing bag for attachment of vacuum hoses and a vacuum gage all of which are sealed by mechanical fittings, putty or tape. A typical example of such prior art is in the U.S. Pat. No. 3,861,977 showing clamps to attach the bag to a tool base.

It can be appreciated that the prior art involved large amounts of skilled manpower, and it is therefore an object of this invention to simplify, and to reduce the labor involved in, the vacuum curing technique.

A more specific object of this invention is to provide a new and improved vacuum curing tool which eliminates the prior art clamps, putty and other time consuming procedures necessary in utilizing these tools in a bagging vacuum operation.

SUMMARY OF THE INVENTION

The vacuum curing tool which accomplishes the foregoing objects comprises a base on which is placed a one piece vacuum bag comprising a top sheet with a peripheral sealing means attached thereto, and a mating sealing means on the base, which cooperate to seal the bag in a zipper-like fashion, thus enclosing a workpiece therein for the vacuum curing operation. A vacuum manifold is attached to the base to supply the vacuum to the base and bag.

From the foregoing and from the following description of the drawings and the preferred embodiment, additional objects and advantages will be apparent to those skilled in this art.

BRIEF DESCRIPTION OF THE DRAWINGS

FIG. 3 is a perspective bottom view of the vacuum curing tool showing the vacuum system therefor; and FIG. 4 is an exploded view, in cross section, of the vacuum curing tool to show the manner in which the tool is sealed.

BRIEF DESCRIPTION OF THE PREFERRED EMBODIMENT

Figure 1:
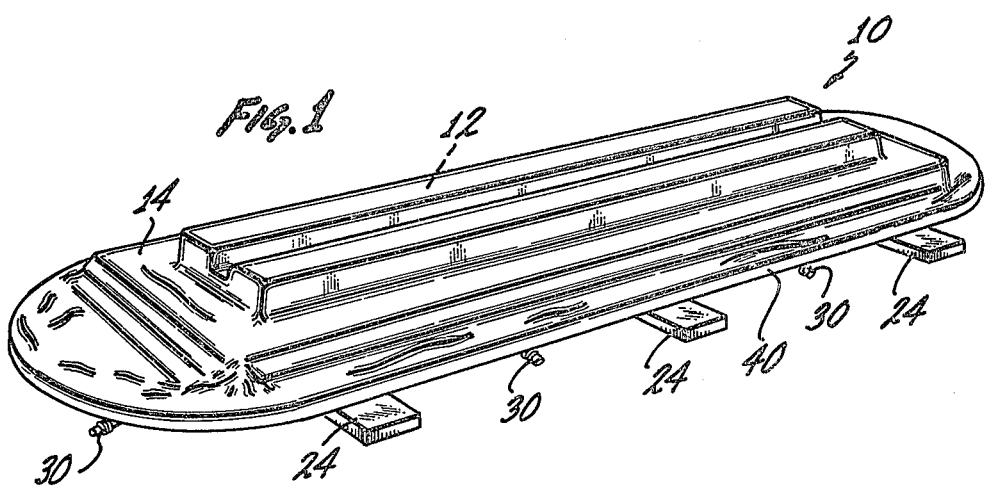
FIG. 1 is a perspective view of a vacuum curing tool formed in accordance with this invention shown with a workpiece under vacuum on the tool.
Figure 2:
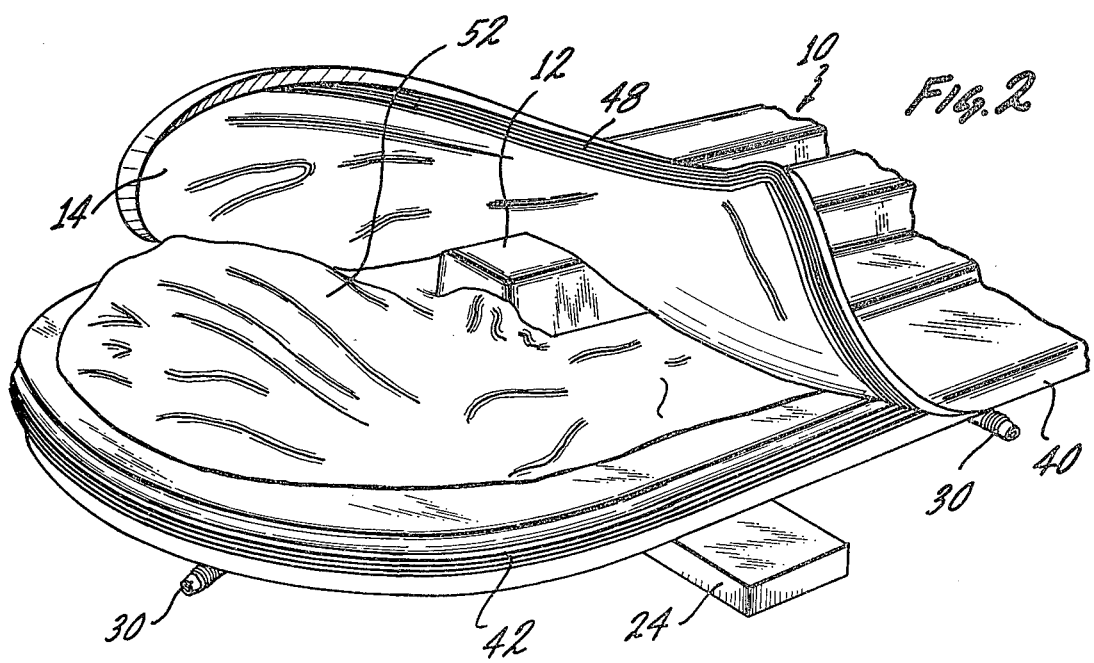
FIG. 2 is a perspective view, enlarged over FIG. 1, showing the vacuum bag open and the manner in which the workpiece is inserted and sealed.

FIG. 1 illustrates the vacuum curing tool 10 with a workpiece 12, under vacuum, during a curing operation, while FIG. 2 shows the manner in which the workpiece is inserted within the vacuum bag 14 before being sealed to perform the curing operation of FIG. 1.

FIGS. 3 and 4 illustrate the details of the vacuum curing tool.

As shown, the vacuum curing tool 10 comprises an oval shaped, preferably metallic, base 16 having a flat top side 18 and underside 20 with a downwardly extending flange 22 on the outer edge of the base which serves space transverse bars 24. Bars 24 form a support for the tool and are connected to the flange 22 by fasteners 26. The flange width accomodates a vacuum manifold 28 for the tool which comprises a plurality of quick disconnect fittings 30, attached to the bottom edge of the flange 22, a plurality of tubes 32 and several types of couplings 34 to couple the various tubes to orifaces 36 provided in the top side of the base. The tubes are curved for extra length to accomodate the difference in coefficient of expansion of the base and tubes.

The vacuum curing tool also includes means for facilitating sealing of the vacuum bag 14. This comprises a two part zipper-like sealing means 40 extending around the bag 14 and base 16. The first part 42 is one continuous piece of rubber with radially outwardly extending lips 44, is attached to and tightly engages the outer periphery of the base and overlaps a portion of the flange 22, as shown in FIG. 4. The first seal part 42 cooperates with a similar seal part 48, also one continuous piece of rubber, having radially inwardly extending lips 50 and is attached to the top part of the bag 14. Bag part 52 is several layers of "bleeder" cloth which allows the vacuum to evenly permeate the sealed volume. Thus, the seal is accomplished by an air tight bag 14 which lays on top of the base 16 with bleeder cloth 52 between which the workpiece 12 is inserted as shown in FIG. 2; the rubber consistency of the sealing parts 42 and 46 is such that their respective lips 44 and 50 engage in a zipper-like fashion when placed together to seal the bag. Actually, FIG. 2 shows the final step in sealing the workpiece 12 in the vacuum bag before the remainder of the sealing parts are brought together and the bag is sealed. After the bag is sealed, the quick disconnect fitting are connected to a suitable pump for providing vacuum within the tool for the curing operation.

From the foregoing it can be seen that utilizing the tool of this invention considerable savings in labor time is accomplished over the technique of the prior art.

What is claimed is:

1. A vacuum curing tool for curing a workpiece comprising:
   a rigid base with a top side having the desired configuration for the workpiece being cured and a vacuum manifold connected to the bottom side thereof;
   a vacuum bag with one part of a peripheral sealing means attached to the bag, said sealing means having radially inwardly extending ribs;
   said peripheral sealing means comprising two parts which engage each other in sealing relationship, one of said parts having a plurality of outwardly extending ribs and being disposed about the peripheral edges of the base, the outwardly extending ribs adapted to engage the radially inwardly extending ribs attached to said bag when brought together in wrap-around zipper-like fashion to form a seal for the bag; and
   means for connecting said vacuum manifold to a vacuum source for withdrawing air from between said bag and the top side of said base during the curing operation on the workpiece disposed on the top side of said base.

2. The vacuum curing tool as claimed in claim 1 wherein said base is oval shaped with a flange extending from the top surface and with one piece of said peripheral sealing means engaging the edges of said base and said flange.

3. A vacuum tool for the vacuum bagging curing of a workpiece comprising;
- a base having a rigid upper surface with the desired configuration for the workpiece and with a peripheral flange;
- a sheet of material to form a vacuum bag;
- a first continuous sealing piece surrounding the base and connected to said peripheral flange and having radially outwardly extending ribs generally below the level of said upper surface;
- a second continuous sealing piece surrounding and connected to said sheet, said second sealing piece having radially inwardly extending ribs and engageable with said radially outwardly extending ribs of said first sealing piece in zipper-like fashion to form a peripherally sealed bag; and
- means for connecting the upper surface of said base and said vacuum bag to a vacuum source for withdrawing air from between said upper surface and said bag to place the workpiece beneath said bag under vacuum.

* * * * *